(12) United States Patent
Giles et al.

(10) Patent No.: US 6,549,371 B1
(45) Date of Patent: Apr. 15, 2003

(54) AUTOMATIC REWIND DETECTION FOR MAGNETIC TAPE CASSETTES

(75) Inventors: Olin S. Giles, New London, NC (US); Richard L. Copeland, Boynton Beach, FL (US); Hubert A. Patterson, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/510,910

(22) Filed: Feb. 23, 2000

(51) Int. Cl.[7] ............................................. G11B 15/00
(52) U.S. Cl. ..................... 360/137; 324/655; 340/572.5
(58) Field of Search ............................ 360/137, 69, 71, 360/72.1, 74.5, 74.7; 324/655, 657; 340/572.5, 654, 674

(56) References Cited

U.S. PATENT DOCUMENTS

| | | | |
|---|---|---|---|
| 4,091,168 A | * 5/1978 | Kawamata | 360/74.7 X |
| 4,466,584 A | 8/1984 | Chevalier et al. | |
| 4,593,337 A | 6/1986 | Leone et al. | |
| 4,673,923 A | 6/1987 | Boscoe et al. | |
| 5,699,262 A | 12/1997 | Lang et al. | |
| 5,956,198 A | * 9/1999 | Kulakowski et al. | 360/71 |
| 6,201,474 B1 | * 3/2001 | Brady et al. | 340/572.8 |

FOREIGN PATENT DOCUMENTS

| | | |
|---|---|---|
| DE | 2521685 A1 | 11/1976 |
| JP | 10021636 A * | 1/1998 |

* cited by examiner

Primary Examiner—David Hudspeth
Assistant Examiner—James L Habermehl
(74) Attorney, Agent, or Firm—Rick F. Comoglio

(57) ABSTRACT

An apparatus and method for determining the position of magnetic tape within a magnetic tape cassette to ascertain whether the magnetic tape is in a rewound position within the cassette is provided. In a first aspect of the present invention, the magnetic tape cassette has two internal magnetic tape take-up reels. The magnetic tape stored on the tape-up reels is detected. The rewound status of the tape is determined by whether the magnetic tape is detected on only one reel or on both reels. In a second aspect of the present invention, a preselected amount of magnetic tape is detected within the magnetic tape cassette. The magnetic tape cassette is oriented and the position of the detected magnetic tape is determined relative to the orientation of the magnetic tape cassette. In a third aspect of the present invention, an electronically detectable member positioned in a known location of the cassette is detected. A preselected amount of magnetic tape within the cassette is detected. The time difference between the detection of the magnetic tape and the detection of the electronically detectable member is used to determine the position of the magnetic tape relative to the cassette. The electronically detectable member can be an electronic article surveillance marker.

24 Claims, 4 Drawing Sheets

AUTOMATIC REWIND DETECTION FOR MAGNETIC TAPE CASSETTES

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to automatic rewind detection of magnetic tape cassettes such as videocassettes, and more particularly to electromagnetic detection of a winding of magnetic tape within a magnetic tape cassette to determine if the magnetic tape is in a rewound position.

2. Description of the Related Art

Presently, in the videotape rental business it is customary that rented videocassettes are to be rewound prior to returning. Many videotape rental stores charge a rewind fee for videocassettes that are returned but not rewound. Videocassettes are typically rented in individual protective containers. Store personnel must visually inspect each videocassette to determine if the returned videocassette has been rewound, and typically must open each individual videocassette container to view the videocassette contained therein. If rewound, the videocassette can be returned to appropriate storage and display shelves. If the returned videocassette has not been rewound, the store personnel rewinds the videocassette and charges the customer a fee for this service. However, requiring visual inspection of each returned videocassette is time consuming, and may not always be performed by store personnel, especially during busy hours at the videotape rental store. Consequently, there is a need for an automatic method of determining if returned videocassettes have been rewound.

With the advent of radio frequency identification (RFID), self-service check-in and checkout of videocassettes is possible. Self-checkout/check-in can speedup the process of renting and returning videotapes by reducing the required interaction of store personnel. If a videotape is returned via self-check-in, a requirement that store personnel must visually inspect every returned videocassette to determine the rewind status defeats some of the advantages of self-check-in. Clearly, in a self-check-in environment there is an even greater need for automatic determination of the rewind status of a returned videocassette.

BRIEF SUMMARY OF THE INVENTION

The present invention is an apparatus and method for determining the position of magnetic tape within a magnetic tape cassette to ascertain whether the magnetic tape is in a rewound position within the cassette. In a first aspect of the present invention, the magnetic tape cassette has two internal magnetic tape take-up reels. The magnetic tape stored on the tape-up reels is detected. The rewound status of the tape is determined by whether the magnetic tape is detected on only one reel or on both reels. The magnetic tape can be detected using an LC resonant circuit or an inductive balanced bridge circuit.

In a second aspect of the present invention, a preselected amount of magnetic tape is detected within the magnetic tape cassette. The magnetic tape cassette is oriented and the position of the detected magnetic tape is determined relative to the orientation of the magnetic tape cassette. The magnetic tape can be detected within an aperture in a housing using an LC resonant circuit or an inductive balanced bridge circuit. The orientation of the magnetic tape cassette is determined by physically or mechanically positioning the cassette, or by detecting an electronically detectable member positioned on or in a known location of the cassette. The time difference between the detection of the magnetic tape and the detection of the electronically detectable member can be used to determine the position of the magnetic tape relative to the cassette. The electronically detectable member can be detected within the aperture using an LC resonant circuit, an inductive balanced bridge circuit, or a harmonic detector. The electronically detectable member can be an electronic article surveillance marker. Alternately, the leading edge of the cassette can be detected upon entry into the aperture, and the time difference between the detection of the magnetic tape and the detection of the leading edge of the cassette can be used to determine the position of the magnetic tape relative to the cassette. Detection of the leading edge of the cassette can be by photo sensor.

In a third aspect of the present invention, an electronically detectable member positioned in a known location of the cassette is detected. A preselected amount of magnetic tape within the cassette is detected. The time difference between the detection of the magnetic tape and the detection of the electronically detectable member is used to determine the position of the magnetic tape relative to the cassette. The electronically detectable member can be an electronic article surveillance marker. The marker can be detected using an LC resonant circuit or an inductive balanced bridge circuit. The preselected amount of magnetic tape can be detected using an LC resonant circuit or an inductive balanced bridge circuit.

A fourth aspect of the present invention provides a method for determining the position of magnetic tape within a magnetic tape cassette having two magnetic tape take-up reels by first detecting magnetic tape within the cassette. The position of the magnetic tape is then determined as a function of whether the magnetic tape is detected on one or both of the take-up reels.

A fifth aspect of the present invention provides a method for determining the position of magnetic tape within a magnetic tape cassette by first orienting the cassette. Then a preselected amount of magnetic tape within the cassette is detected, and the position of the preselected amount of magnetic tape is determined as a function of the orientation of the cassette. Orienting the cassette can be done physically or mechanically, or by detecting an electronically detectable member positioned in a known location on or in the cassette. The time difference between detecting the electronically detectable member and detecting the preselected amount of magnetic tape is then determined. The position within the cassette of the preselected amount of magnetic tape is a function of the time difference. Orienting the cassette can be done mechanically or physically by inserting the cassette into an aperture within a housing in a known orientation, or which receives the cassette only in a known orientation. The leading edge of the cassette can then be detected, and the time difference between detecting the leading edge and detecting the preselected amount of magnetic tape is determined. The position within the cassette of the preselected amount of magnetic tape is a function of the time difference.

Accordingly, it is an object of the present invention to determine the position of magnetic tape within a magnetic tape cassette by detecting whether the magnetic tape is on one or both take-up reels within the cassette.

It is a further object of the present invention to determine the position of magnetic tape within a magnetic tape cassette by orienting a magnetic tape cassette and detecting the magnetic tape relative to the known orientation of the cassette.

It is yet another object of the present invention to determine the position of magnetic tape within a magnetic tape cassette by determining the time difference between detecting an electronically detectable member in a known location in or on the cassette, and detecting a preselected amount of magnetic tape within the cassette, where the position of the preselected amount of magnetic tape is a function of the time difference.

Other objectives, advantages, and applications of the present invention will be made apparent by the following detailed description of the preferred embodiment of the invention.

DETAILED DESCRIPTION OF THE INVENTION

Figure 1:
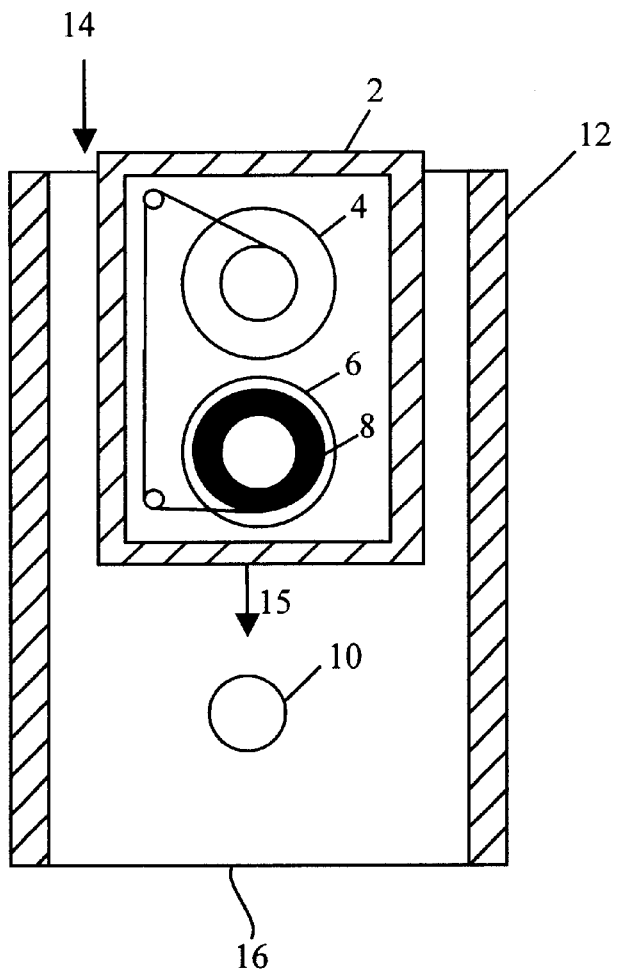
FIG. 1 is a side elevational view, in partial cross-section, of one embodiment of the present invention.

Referring to FIG. 1, magnetic tape cassette 2 is illustrated with internal magnetic tape take-up reels 4 and 6. Magnetic tape cassette 2 is illustrated and described herein as a videocassette, but can be an audio or data cassette. A quantity of magnetic tape 8 is illustrated as being stored entirely on take-up reel 6, but can be positioned entirely on take-up reel 4, or partially on both take-up reels 4 and 6. Sensor 10 detects magnetic tape 8 as the magnetic tape 8 comes in close proximity to sensor 10, as fully described hereinbelow. A housing 12 can be used to hold sensor 10, and to receive cassette 2 through aperture 14. Aperture 14 is sized to receive cassette 2 only in the length configuration, and not width, so that cassette 2 must enter narrow end first, as illustrated. Housing 12 can be a cassette return "chute" such that cassette 2 is inserted into aperture 14, free falls through housing 12 in the direction of arrow 15, and exits housing 12 at end 16 to be retained in a suitable container adjacent end 16 (not shown). The housing 12 can be part of a self-check-in system for videocassettes, and an RFID tag may be affixed to cassette 2 for identification (not shown).

The position of magnetic tape 8 on tape-up reels 4 and 6 determines whether the cassette has or has not been rewound. In this embodiment, if magnetic tape 8 is detected upon both reels, it is assumed that magnetic tape 8 has not been rewound. If magnetic tape 8 is detected on only one reel, it is assumed that magnetic tape 8 has been rewound. The assumption that the magnetic tape 8 is rewound if found on only one reel is based upon the following. It is believed that the invention will be primarily used in a videocassette rental business. In videocassette rental, the majority of videos are returned either rewound or with magnetic tape on both take-up reels. The majority of videocassette users watches the prerecorded portion of the videotape and then either rewinds the cassette, or stops the tape and removes it from the videocassette recorder (VCR), in which case magnetic tape 8 will remain on both reels 4 and 6. Typically, the user does not continue to allow the VCR to play until the magnetic tape 8 is fully extended to the end. In addition, if the user does allow the VCR to run, extending the magnetic tape 8 fully to the end, the majority of VCRs will automatically rewind when the magnetic tape 8 is fully advanced.

In operation, a detectable signal is produced by sensor 10 each time a preselected quantity of magnetic tape 8 comes in close proximity to sensor 10. The amount of magnetic tape 8 that produces a detection signal from sensor 10 depends upon the sensitivity of sensor 10, as described hereinbelow. As stated above, magnetic tape 8 will either be totally on reel 4 or 6, or partially on both reels 4 and 6. If magnetic tape 8 is totally on one reel, sensor 10 will produce one signal as cassette 2 moves past sensor 10. If magnetic tape 8 is partially on both reels 4 and 6, sensor 10 will produce two signals, one for each detectable quantity of magnetic tape 8 on reel 4 and 6 when cassette 2 moves past sensor 10.

Sensor 10 can be a simple coil that produces a small electronic signal when magnetic material is placed near the coil. While a simple coil will work as a detector, it is not very sensitive requiring a relatively large amount of magnetic material before detection occurs. A more sensitive method of detection is to use a resonant circuit as the sensor.

Figure 2:
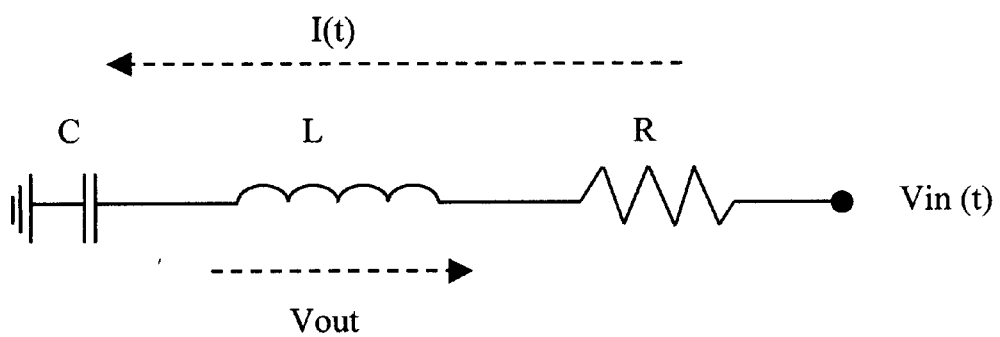
FIG. 2 is a schematic of a magnetic sensor of the present invention.

Referring to FIG. 2, R, L, and C represent the circuit parameters for resistance, inductance, and resonating capacitance. An oscillator produces the circuit input voltage Vin(t) at frequency f. The coil circuit represented by R, L, and C is chosen to produce a resonance at frequency f. When magnetic material comes into close proximity of the coil, the inductance L is increased by a significant factor, thus causing the current I(t) to decrease and the voltage across the coil Vout(t) to increase. The increase in Vout(t) is measurable and used as a detector for magnetic material. When an input voltage Vin(t) is present, Vout(t) will always be present at some level, and increases slightly when magnetic material is near. While a resonant circuit is more sensitive than a simple coil, measurement of the change in the level of Vout(t) during a detection limits the sensitivity of a resonant circuit detector.

Figure 3:
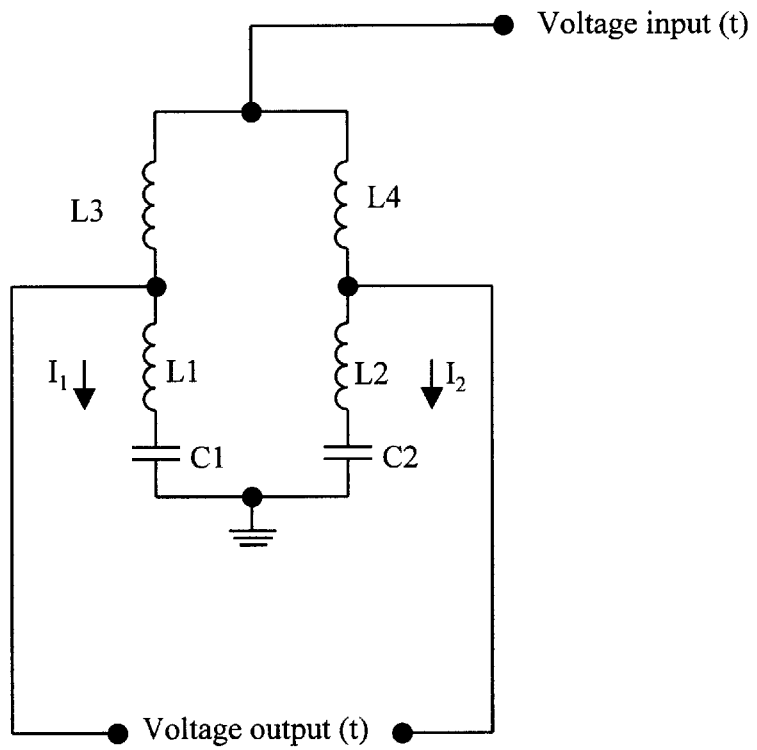
FIG. 3 is a schematic of an alternate embodiment of a magnetic sensor of the present invention.

Referring to FIG. 3, an even more sensitive detector is illustrated as a four-element inductive balanced bridge circuit. The circuit includes four identical coils represented by L1, L2, L3, and L4. Resonating capacitors C1 and C2 are chosen so that each branch of the circuit is under resonance at an input voltage(t) at the resonance frequency. The detection coil, represented by L4, is the actual coil used as sensor 10 in the housing or chute to sense magnetic material. In the absence of magnetic material in proximity to L4, the output voltage(t) is zero. Here, the two branch currents I1 and I2 to ground are identical. With close proximity of magnetic material to coil L4 the branch currents become dissimilar and the output voltage rises above zero. The balanced bridge circuit is very sensitive, and a very small quantity of magnetic material, producing a correspondingly small change in L4, will be detectable at the output voltage (t). The sensitivity of the balanced bridge circuit makes it the preferred detector for detecting magnetic tape 8 as described herein.

Figure 4:
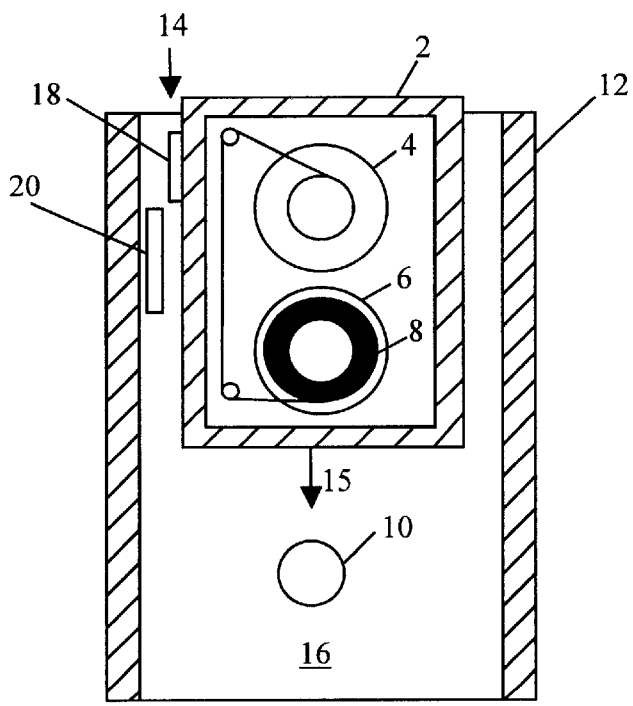
FIG. 4 is a side elevational view, in partial cross-section, of an alternate embodiment of the present invention.
Figure 5:
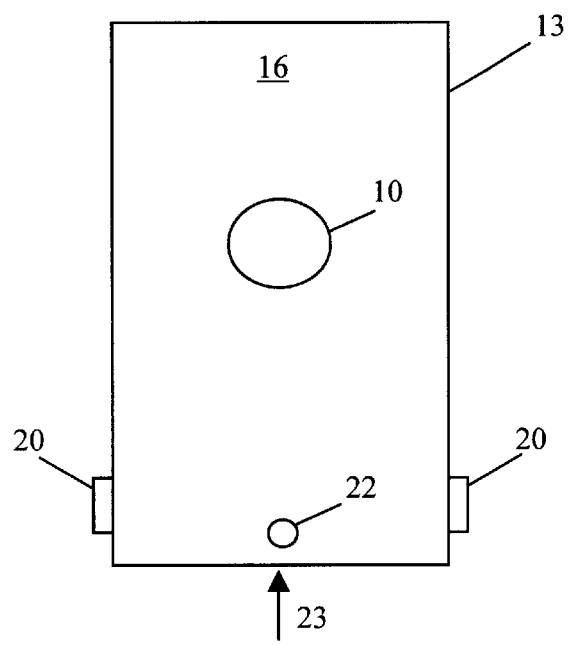
FIG. 5 is a side elevational view, in partial cross-section, of an alternate embodiment of the present invention.

Referring to FIG. 4, a preferred embodiment of the present invention is illustrated. Features of the embodiment illustrated and discussed hereinabove have the same reference numerals as identical features in subsequent embodiments, including the instant preferred embodiment. As discussed above, the determination of whether the magnetic tape 8 has been rewound or not by detecting magnetic tape 8 on one or both reels 4 and 6 has limitations that permit opportunities for error. In videocassette rental businesses the small potential for error can be acceptable because the invention provides an improvement in manual labor intensive techniques used previously. If an electronically detectable member 18 is connected to cassette 2 in a known location, the rewound status of magnetic tape 8 can be determined in a superior manner as described below.

The electronically detectable member 18 can be any electronically detectable member including magnetic material such as an electronic article surveillance (EAS) marker that is detectable by electronic sensor. A suitable EAS marker is disclosed in U.S. Pat. No. 4,510,489. It is desirable to use EAS markers for electronically detectable members because many videocassette inventories already have EAS markers affixed to the videocassettes. Electronically detectable member 18 can be connected to cassette 2 in a preselected location by attachment to the exterior or interior or by capturing during the manufacture or assembly of cassette 2. The location of member 18 on or in cassette 2 will always be substantially the same for all cassettes 2 that have a connected electronically detectable member 18. The position of detected magnetic tape 8 is determined in relation to member 18. Because the position of electronically detectable member 18 is known on cassette 2, the orientation of reels 4 and 6 within cassette 2 will also be known in relation to member 18. Thus, determining onto which reel, 4 or 6, magnetic tape 8 is stored determines whether the magnetic tape 8 within cassette 2 has been rewound. Sensor 10 detects a preselected quantity of magnetic tape 8, which is indicated as a detectable signal. Sensor 20 detects electronically detectable member 18 as member 18 moves past sensor 20. Sensor 20 can be identical to sensor 10 described hereinabove tuned to detect member 18, and thus the detector circuits shown in FIGS. 2 and 3 apply equally to sensor 20, with the four-element inductive balanced bridge circuit illustrated in FIG. 3 being the preferred embodiment. Sensor 20 is tuned to detect member 18, which can be as EAS marker, and sensor 10 is tuned to detect magnetic tape 8. In addition, the physical location of sensor 10 and sensor 20 in housing 12 is selected to come into proximity of magnetic tape 8 and member 18, respectively, as shown in FIG. 4. Therefore, magnetic tape 8 will not be detected by sensor 20, and member 18 will not be detected by sensor 10.

The time difference between detecting the preselected quantity of magnetic tape 8 and detecting the electronically detectable member 18 is used to determine the rewound status of cassette 2. If magnetic tape 8 is stored entirely on reel 6, as shown in FIG. 4, there will be a first time difference between the detection of member 18 and the detection of magnetic tape 8. If a detectable quantity of magnetic tape 8 is stored on reel 4, there will be a second time difference between the detection of member 18 and the detection of magnetic tape 8. The time differences and orientation of cassette 2 are used to indicate whether tape 8 is rewound or not rewound.

Figure 6:
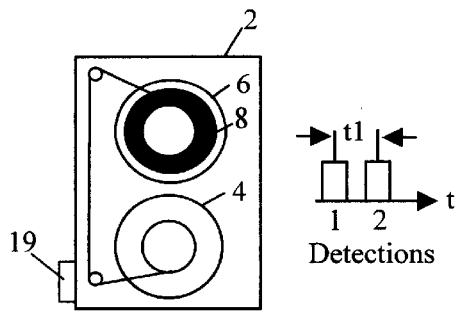
FIGS. 6, 7, 8, and 9 each illustrate an alternate orientation for entry of a cassette into the housing of FIG. 5, and the resultant detection time differences.
Figure 7:
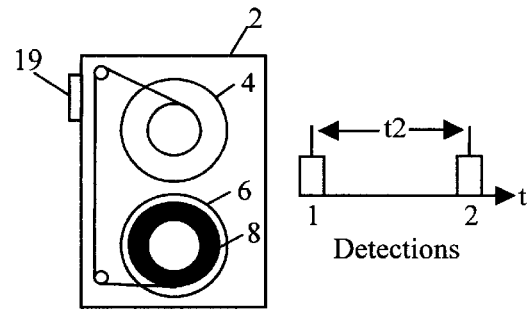
Figure 8:
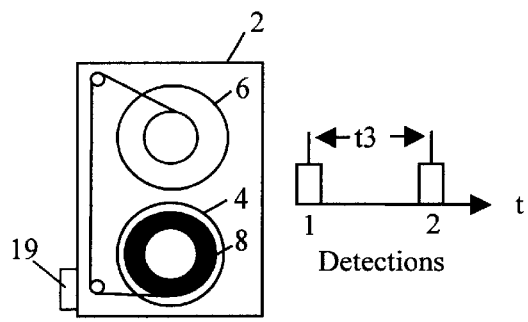
Figure 9:
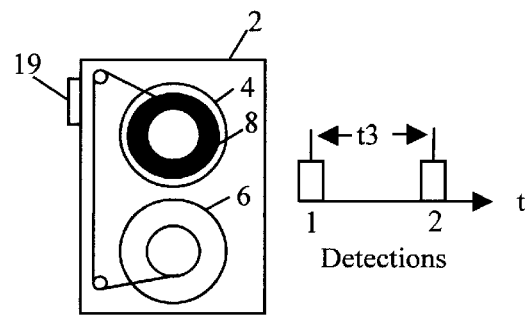

Referring to FIGS. 5–9, an operational example is illustrated with housing 13 being similar to housing 12 except there are two sensors 20 mounted thereto. Cassette 2, in which electronically detectable member 18 is shown to be an EAS marker 19, enters housing 13 in the direction of arrow 23, shown in FIG. 5. An optical or infrared sensor 22 can be used to activate sensors 10 and 20, and is further described hereinbelow. FIGS. 6–9 represent possible orientations for entry of cassette 2 into housing 13 in the direction of arrow 23. For the illustrated example, FIGS. 6 and 7 represent the rewound position of cassette 2 in which all of the magnetic tape 8 stored on reel 6. FIGS. 8 and 9 represent the non-rewound position of cassette 2 in which a detectable quantity of magnetic tape 8 is on reel 4. There are 4 other orientations that are flipped 180 degrees from those illustrated in FIGS. 6–9 so that EAS marker 19 is on the right-hand side with respect to cassette 2 (not shown). The 4 orientations not shown produce identical results to the results for the 4 orientations described and illustrated herein because of the second sensor 20 mounted in housing 13 and are not separately described. In the following description, cassette 2 is assumed to enter housing 13 shown in FIG. 5 in the orientation as shown in each FIGS. 6 through 9.

Referring to FIG. 6, as stated above, if the cassette 2 is rewound, all of the magnetic tape 8 will be on reel 6. The time difference t1 is the time difference between the first and second detection of magnetic tape 8 on reel 6 and EAS marker 19. T1 is the time difference expected for a cassette 2 that is rewound and entering housing 13 in the orientation shown. In FIG. 7, the time difference t2, between detection of magnetic tape 8 on reel 6 and the detection of EAS marker 19, will be the time difference expected for a cassette 2 that is rewound and entering housing 13 in the orientation shown. In FIGS. 8 and 9, if magnetic tape 8 is detected on reel 4, the time difference t3, between detection of magnetic tape 8 on reel 4 and the detection of EAS marker 19, will be the time difference expected for a cassette 2 that is not rewound and entering housing 13 in either orientation shown. In FIGS. 6–9, it does not matter which is detected first and second between magnetic tape 8 and EAS marker 19, because it is the time difference t1, t2, and t3 that is being measured.

Cassette 2 can be made to pass by sensors 10 and 20 at a known rate to simplify timing of t1, t2, and t3. This can be accomplished by forcing cassette 2 to pass through housing 13 at a known rate, such as by gravity or mechanical mechanism. Alternately, a housing can hold cassette 2 fixed, and sensors 10 and 20 can be moved in relation to cassette 2.

Figure 10:
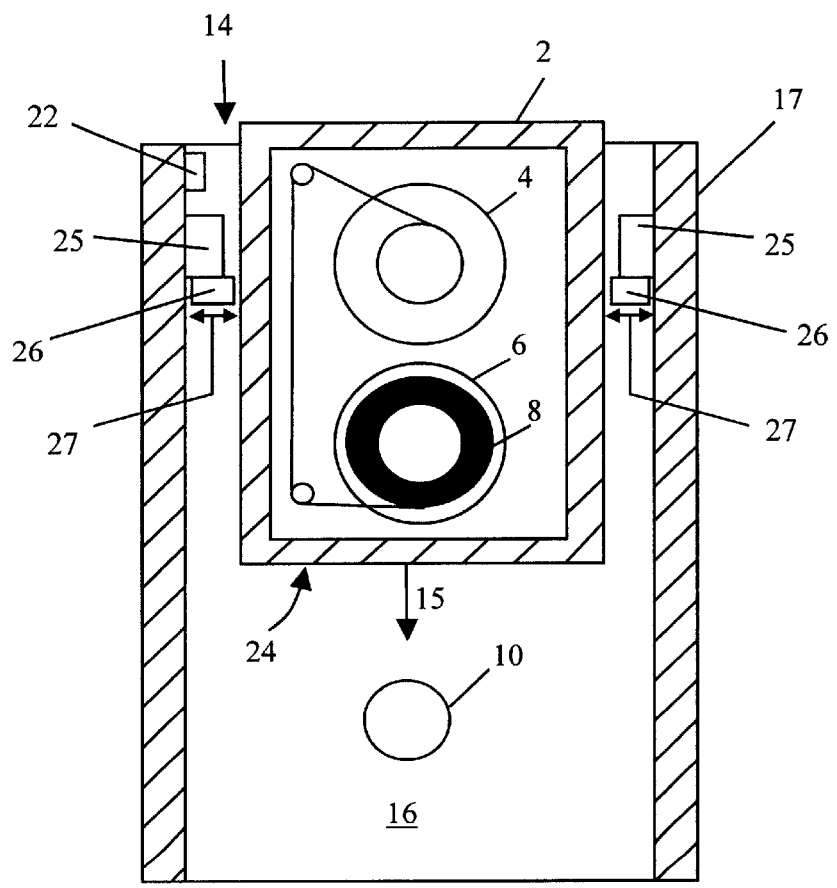
FIG. 10 is a side elevational view, in partial cross-section, of an alternate embodiment of the present invention.

Referring to FIG. 10, an alternate embodiment of the present invention is illustrated with an optical or infrared sensor 22 used to sense the leading edge 24 of cassette 2 as cassette 2 falls through housing 17. In this embodiment, housing 17 will be similar to housing 12 except it will include a mechanism 25 to properly orient cassette 2. Mechanism 25 can be any mechanism that restricts the orientation of cassette 2 to a desired orientation for insertion into housing 17, and can include a barcode reader or radio frequency identification reader that will only allow cassette 2 to pass into housing 17 in the desired orientation. For example, a latch 26 may move in the direction of arrow 27 to restrict entry of cassette 2 in all but the desired orientation. Latch 26, which could be configured as a doorway, can be opened by proper reading of a barcode on cassette 2 placed in a known location for reading only when cassette 2 is correctly oriented in housing 17. Alternately, mechanism 25 can be mechanical such as a tongue and groove arrangement to accomplish the desired orientation of cassette 2, in which case cassette 2 would need a corresponding mechanism (not shown). Sensor 22, and mechanism 25, can be utilized with any of the embodiments described herein to trigger the beginning of a rewind detection or to orient cassette 2, respectively.

In the embodiment shown in FIG. 10, sensor 22 detects the leading edge 24 of cassette 2. Sensor 10 detects magnetic tape 8 either on reel 4 or reel 6. One reel, either 4 or 6, is where magnetic tape 8 is stored when the cassette 2 is rewound. A time difference between detecting the leading edge 24 of cassette 2 and detecting magnetic tape on reel 4 produces a first time difference. A second time difference, results from detecting the leading edge 24 of cassette 2 and detecting magnetic tape on reel 6. The value of the first and second time differences determines whether magnetic tape 8 is rewound. For example, assume that magnetic tape 8 is stored on reel 6 when cassette 2 is rewound. Then the first time difference measured between detecting the leading edge 24 and detecting magnetic tape on reel 6 is the expected time difference for a rewound cassette 2. If a second time difference is measured, then the cassette 2 is not rewound.

Figure 11:
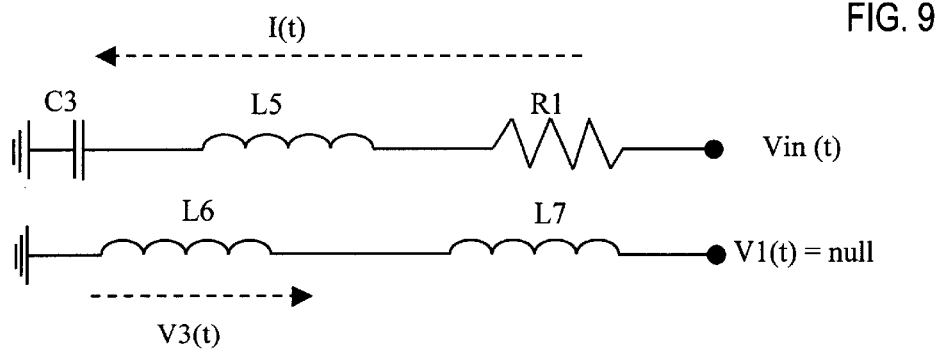
FIG. 11 is a schematic of an alternative embodiment of a detector of the present invention.

Referring to FIG. 11, an alternate detector for EAS marker 19 used as electronically detectable marker 18 is illustrated as a harmonic detector which detects harmonic signals generated by marker 19 when exposed to a fundamental excitation frequency. The harmonic detector includes a transmitter coil, represented by R1 and L5 and is resonated by capacitor C3. The coil provides a fundamental excitation field at frequency f1. A FIG. 8 pair of coils, represented by L6 and L7, forms an opposed phase pair of sense coils. The voltage V3(t) across this pair of coils is nulled or near zero. When an EAS marker 19 comes into close proximity of either coil L6 or L7, a non-zero signal V3(t) is produced which includes the second harmonic signal at frequency 2f1. The second harmonic signal is produced only by an EAS marker 19 and not any other part or material of cassette 2, and therefore provides a unique detector for EAS marker 19.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. An apparatus for determining the position of magnetic tape within a magnetic tape cassette having magnetic tape and two magnetic tape take-up reels disposed therein, comprising:

means for detecting the magnetic tape within the magnetic tape cassette; and, means for determining a rewound position of the magnetic tape as a function of whether said means for detecting detects magnetic tape on both of the take-up reels or only one of the take-up reels.

2. The apparatus of claim 1 wherein said means for detecting the magnetic tape comprises a capacitor and an inductive coil forming an LC resonant circuit.

3. The apparatus of claim 2 wherein said means for detecting the magnetic tape comprises a second capacitor and a second inductive coil forming a second LC resonant circuit, and a third inductive coil and a fourth inductive coil forming an inductive balanced bridge circuit.

4. An apparatus for determining the position of magnetic tape within a magnetic tape cassette having magnetic tape disposed therein, comprising:

means for detecting a preselected amount of magnetic tape within the magnetic tape cassette;

means for determining the orientation of the magnetic tape cassette; and, means for determining the position of said preselected amount of magnetic tape relative to the magnetic tape cassette.

5. The apparatus of claim 4 further comprising a housing having an aperture sized to receive the magnetic tape cassette, and wherein said means for detecting detects said preselected amount of magnetic tape when the magnetic tape cassette is disposed within said aperture.

6. The apparatus of claim 5 wherein said means for detecting is a detector comprising an inductive coil and a capacitor forming an LC resonant circuit, said inductive coil disposed adjacent said aperture, wherein when the magnetic tape cassette is disposed in said aperture, a preselected amount of said magnetic tape proximate said inductive coil results in a detectable change in the inductance of said inductive coil and a measurable change in the resonance of the LC resonant circuit.

7. The apparatus of claim 6 wherein said detector comprises an inductive balanced bridge circuit having a plurality of inductive coils and a plurality of capacitors, at least one of said inductive coils being disposed adjacent said aperture, said bridge circuit having a first output, and having a second output when said preselected amount of magnetic tape is proximate said inductive coil disposed adjacent said aperture.

8. The apparatus of claim 6 wherein said means for determining the orientation comprises:

an electronically detectable member disposed in a preselected position of the magnetic tape cassette; and, means for determining the time difference between the detection of said preselected amount of magnetic tape and the detection of said electronically detectable member, wherein the position of said preselected amount of magnetic tape relative to the magnetic tape cassette is a function of said time difference.

9. The apparatus of claim 8 wherein said means for detecting said electronically detectable member comprises a second inductive coil and a second capacitor forming a second LC resonant circuit, said second inductive coil disposed adjacent said aperture, wherein when the magnetic tape cassette is disposed in said aperture, said electronically detectable member proximate said second inductive coil results in a detectable change in the inductance of said second inductive coil and a measurable change in the resonance of the second LC resonant circuit.

10. The apparatus of claim 9 wherein;

said detector comprises a first inductive balanced bridge circuit having a first plurality of inductive coils and a first plurality of capacitors, at least one of said first plurality of inductive coils being disposed adjacent said aperture, said first balanced bridge circuit having a first output and having a second output when said preselected amount of magnetic tape is proximate said one of said first plurality of inductive coils disposed adjacent said aperture; and, said means for detecting said electronically detectable member comprises a second inductive balanced bridge circuit having a second plurality of inductive coils and a second plurality of capacitors, at least one of said second plurality of inductive coils being disposed adjacent said aperture, said second balanced bridge circuit having a first output and having a second output when said electronically detectable member is proximate said one of said second plurality of inductive coils disposed adjacent said aperture.

11. The apparatus of claim 8 wherein said means for detecting said electronically detectable member is a harmonic detector comprising a pair of sense coils having a first output in the presence of a transmitted fundamental excitation frequency, the interaction of said electronically detectable member proximate at least one of said sense coils in the presence of said transmitted fundamental excitation frequency results in a second output from said pair of sense coils.

12. The apparatus of claim 8 wherein said electronically detectable member is an electronic article surveillance marker.

13. The apparatus of claim 5 wherein said means for determining the position of said preselected amount of magnetic tape relative to the magnetic tape cassette comprises means for detecting the leading edge of the magnetic tape cassette as it enters said aperture in a preselected orientation and means for determining the time difference between the detection of said leading edge and the detection of said preselected amount of magnetic tape, wherein the position of said preselected amount of magnetic tape is a function of said time difference.

14. The apparatus of claim 13 wherein said means for detecting the leading edge of the magnetic tape cassette comprises a photo sensor.

15. An apparatus for determining the position of magnetic tape within a magnetic tape cassette having magnetic tape disposed therein, comprising:
an electronically detectable member connected with the magnetic tape cassette in a preselected position;
means for detecting said electronically detectable member;
means for detecting a preselected amount of magnetic tape within the magnetic tape cassette;
means for determining the time between the detection of said electronically detectable member and the detection of said preselected amount of magnetic tape; and,
means for determining the position within the magnetic tape cassette of said preselected amount of magnetic tape in relation to said electronically detectable member as a function of the time from said means for determining the time.

16. The apparatus of claim 15 wherein said electronically detectable member is an electronic article surveillance marker.

17. The apparatus of claim 16 wherein said means for detecting said marker comprises a capacitor and an inductive coil forming an LC resonant circuit.

18. The apparatus of claim 17 wherein said means for detecting said marker comprises a second capacitor and a second inductive coil forming a second LC resonant circuit, a third inductive coil and a fourth inductive coil, said first and said second LC resonant circuits and said third and said fourth inductive coils forming an inductive balanced bridge circuit.

19. The apparatus of claim 15 wherein said means for detecting said magnetic tape comprises a capacitor and an inductive coil forming an LC resonant circuit.

20. The apparatus of claim 19 wherein said means for detecting said magnetic tape comprises a second capacitor and a second inductive coil forming a second LC resonant circuit, a third inductive coil and a fourth inductive coil, said first and said second LC resonant circuits and said third and said fourth inductive coils forming an inductive balanced bridge circuit.

21. A method for determining the position of magnetic tape within a magnetic tape cassette having two magnetic tape take-up reels therein, comprising the steps of:
detecting magnetic tape within the magnetic tape cassette; and,
determining the position of said magnetic tape as a function of whether said detecting step detects magnetic tape on both of the take-up reels or only one of the take-up reels.

22. A method for determining the position of magnetic tape within a magnetic tape cassette, comprising the steps of:
determining the orientation of the magnetic tape cassette;
detecting a preselected amount of magnetic tape within the magnetic tape cassette; and,
determining the position of said preselected amount of magnetic tape relative to the magnetic tape cassette, wherein the position of the magnetic tape is a function of said orientation.

23. The method of claim 22 wherein the step of determining the orientation of the magnetic tape cassette comprises detecting an electronically detectable member disposed in a preselected position of the magnetic tape cassette; and,
determining the time difference between the detection of said preselected amount of magnetic tape and the detection of said electronically detectable member, wherein the position of said preselected amount of magnetic tape relative to the magnetic tape cassette is a function of said time difference.

24. The method of claim 22 wherein the step of determining the orientation of the magnetic tape cassette comprises inserting the magnetic tape cassette into an aperture within a housing in a preselected orientation only; and, wherein the step of determining the position of said preselected amount of magnetic tape relative to the magnetic tape cassette comprises the steps of:
detecting the leading edge of the magnetic tape cassette as it enters said aperture; and,
determining the time difference between the detection of said leading edge and the detection of said preselected amount of magnetic tape, wherein the position of said preselected amount of magnetic tape is a function of said time difference.

* * * * *

UNITED STATES PATENT AND TRADEMARK OFFICE
CERTIFICATE OF CORRECTION

PATENT NO. : 6,549,371 B1 Page 1 of 1
DATED : April 15, 2003
INVENTOR(S) : Giles et al.

It is certified that error appears in the above-identified patent and that said Letters Patent is hereby corrected as shown below:

<u>Column 7,</u>
Line 30, replace "FIG. 8" with -- figure-8 --.

Signed and Sealed this

First Day of July, 2003

JAMES E. ROGAN
*Director of the United States Patent and Trademark Office*